(12) United States Patent
Waku

(10) Patent No.: US 10,272,770 B2
(45) Date of Patent: Apr. 30, 2019

(54) CARBON-FIBER-REINFORCED PLASTIC STRUCTURE AND FUEL TANK

(75) Inventor: Hiroyuki Waku, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 222 days.

(21) Appl. No.: 13/977,311

(22) PCT Filed: Mar. 8, 2012

(86) PCT No.: PCT/JP2012/055944
§ 371 (c)(1),
(2), (4) Date: Jun. 28, 2013

(87) PCT Pub. No.: WO2012/121322
PCT Pub. Date: Sep. 13, 2012

(65) Prior Publication Data
US 2013/0277372 A1    Oct. 24, 2013

(30) Foreign Application Priority Data

Mar. 10, 2011    (JP) .................................. 2011-053128

(51) Int. Cl.
*B60K 15/03* (2006.01)
*B32B 15/08* (2006.01)
(Continued)

(52) U.S. Cl.
CPC ........ *B60K 15/03177* (2013.01); *B32B 15/02* (2013.01); *B32B 15/08* (2013.01);
(Continued)

(58) Field of Classification Search
CPC ......... B32B 15/14; B32B 17/02; B32B 15/08; B32B 15/20; B32B 15/02;
(Continued)

(56) References Cited

U.S. PATENT DOCUMENTS 4,502,092 A * 2/1985 Bannink, Jr. .......... B64D 45/02
244/1 A
6,910,659 B2 * 6/2005 Friddell et al. ........... 244/135 R
(Continued)

FOREIGN PATENT DOCUMENTS

EP    0 783 960    7/1997
EP    1 484 245    12/2004
(Continued)

OTHER PUBLICATIONS

Webster's Revised Unabridged Dictionary, Version published 1913, C. & G. Merriam Co., Springfield, Mass., Under the direction of Noah Porter, D.D., LL.D.*
(Continued)

*Primary Examiner* — Gerard Higgins
*Assistant Examiner* — Kevin C Ortman, Jr.
(74) *Attorney, Agent, or Firm* — Wenderoth, Lind & Ponack, L.L.P.

(57) ABSTRACT

A spar as a carbon-fiber-reinforced plastic structure according to the present invention includes a carbon fiber prepreg, and a conduction layer provided on a surface of this carbon fiber prepreg to limit conduction in a thickness direction of a carbon fiber and secure conduction in a surface direction of the carbon fiber.

1 Claim, 2 Drawing Sheets

(51) Int. Cl.
  *B32B 17/02* (2006.01)
  *B32B 15/14* (2006.01)
  *B64C 3/34* (2006.01)
  *B64D 45/02* (2006.01)
  *B32B 15/02* (2006.01)
  *B32B 15/20* (2006.01)

(52) U.S. Cl.
  CPC .............. *B32B 15/14* (2013.01); *B32B 15/20* (2013.01); *B32B 17/02* (2013.01); *B64C 3/34* (2013.01); *B64D 45/02* (2013.01); *B32B 2255/02* (2013.01); *B32B 2255/26* (2013.01); *B32B 2260/023* (2013.01); *B32B 2260/046* (2013.01); *B32B 2262/101* (2013.01); *B32B 2262/106* (2013.01); *B32B 2307/202* (2013.01); *B32B 2307/206* (2013.01); *B32B 2605/00* (2013.01); *B32B 2605/18* (2013.01); *Y10T 428/249921* (2015.04)

(58) Field of Classification Search
  CPC ........ B32B 2307/206; B32B 2262/101; B32B 2260/046; B32B 2255/02; B32B 2260/023; Y10T 428/249921; B64D 45/02; B60K 15/03177; B64C 3/34
  USPC ........ 428/293.4, 300.7, 221, 35.7, 141, 156, 428/212, 216, 219, 331, 343, 355 EP, 428/401, 408, 447, 457, 474.4; 220/562; 244/172.3, 172.2, 135 B, 135 R
  See application file for complete search history.

(56) References Cited

U.S. PATENT DOCUMENTS

| | | | |
|---|---|---|---|
| 7,090,167 B2 * | 8/2006 | Friddell et al. | ............ 244/123.1 |
| 2004/0075027 A1 * | 4/2004 | Friddell et al. | ........... 244/135 R |
| 2005/0150596 A1 * | 7/2005 | Vargo et al. | ................... 156/324 |
| 2005/0274848 A1 * | 12/2005 | Friddell et al. | ............ 244/123.6 |
| 2008/0308678 A1 * | 12/2008 | Purdy | ...................... B05D 5/00 244/133 |
| 2010/0020461 A1 | 1/2010 | Heeter et al. | |
| 2010/0219287 A1 | 9/2010 | Sanchez-Brunete Álvarez et al. | |
| 2013/0277372 A1 * | 10/2013 | Waku | ........................... 220/562 |
| 2014/0011588 A1 * | 1/2014 | Masuyama et al. | ........... 463/31 |

FOREIGN PATENT DOCUMENTS

| | | |
|---|---|---|
| EP | 2 676 792 | 12/2013 |
| JP | 09-193296 | 7/1997 |
| JP | 2010-126133 | 6/2010 |
| JP | 2010-234900 | 10/2010 |
| JP | 2010-235133 | 10/2010 |
| WO | 2010/035021 | 4/2010 |
| WO | 2010/113640 | 10/2010 |
| WO | WO 2010142593 A1 * | 12/2010 ............. B29C 49/22 |

OTHER PUBLICATIONS

Ranganathaiah (Ranganathaiah, et al., "A method for characterizing thermoset polyimides," NASA Technical Memorandum, 1996, p. 1-8).*

Xiao (Xiao, et al., "Thermosetting polyimides with improved impact toughness and excellent thermal and thermos-oxidative stability," High Performance Polymers, 13, 2001, p. 287-299).*

International Search Report dated Jun. 12, 2012 in International (PCT) Application No. PCT/JP2012/055944 with English translation.

Written Opinion of the International Searching Authority dated Jun. 12, 2012 in International (PCT) Application No. PCT/JP2012/055944 with English translation.

Extended European Search Report dated Jul. 15, 2014 in corresponding European Patent Application No. 12755239.6.

* cited by examiner

CARBON-FIBER-REINFORCED PLASTIC STRUCTURE AND FUEL TANK

TECHNICAL FIELD

The present invention relates to a carbon-fiber-reinforced plastic structure made of a carbon-fiber-reinforced plastic, and a fuel tank formed of the same.

Priority is claimed on Japanese Patent Application No. 2011-053128, filed Mar. 10, 2011, the contents of which is incorporated herein by reference.

BACKGROUND ART

Conventionally, a fuel tank of an aircraft is generally formed of a metal material such as an aluminum alloy, similar to other structures constituting the aircraft. The metallic structure constituting the fuel tank in this way has a secondary function of diffusing static electricity generated due to friction with fuel to the vicinity, as well as a function of containing the fuel.

However, in recent years, a main structure of an aircraft has been made of a so-called composite material, e.g., carbon-fiber-reinforced plastic (hereinafter abbreviated as "CFRP") from the viewpoint of weight reduction and reinforcement of the aircraft (e.g., see Patent Literature 1). This carbon-fiber-reinforced plastic structure (hereinafter abbreviated as a "CFRP structure") is obtained by heating a carbon fiber prepreg formed by stacking a plurality of sheets each obtained by soaking a thermosetting resin into a carbon fiber to cure the thermosetting resin and unify the sheets. Further, in such a CFRP structure, a so-called resin layer is formed on a surface of the structure by a thermosetting resin exuded from a carbon fiber when the carbon prepreg is heated.

CITATION LIST

Patent Literature

[Patent Literature 1] Japanese Unexamined Patent Application, First Publication No. H09-193296

SUMMARY OF INVENTION

Problem to be Solved by the Invention

Generally, a structure in which a space in a wing is used as a fuel tank is adopted in an aircraft. Accordingly, in an aircraft adopting a CFRP structure, a space surrounded by a CFRP structure is used as the fuel tank.

However, a conventional CFRP structure constituting the fuel tank does not have electrical conductivity as a whole structure since a surface of the structure is covered by a resin layer with no electrical conductivity even though a carbon fiber itself has electrical conductivity. Accordingly, in the conventional CFRP structure, there is a problem in that the structure cannot have a secondary function of diffusing static electricity generated due to friction with fuel to the vicinity since there is no electrical conductivity that a fuel tank inside a conventional aluminum alloy wing necessarily has.

The present invention has been made in consideration of the above circumstances, and an object of the present invention is to provide a means that adds a secondary function of diffusing static electricity generated due to friction with fuel to the vicinity to a CFRP structure constituting a fuel tank.

Means for Solving the Problem (1) A carbon-fiber-reinforced plastic structure according to the present invention includes a carbon fiber prepreg; and a conduction layer provided on a surface of the carbon fiber prepreg to limit conduction in a thickness direction of a carbon fiber and secure conduction in a surface direction of the carbon fiber.

According to such a configuration, since the conduction in the surface direction of the carbon fiber is secured by the conduction layer but the conduction in the thickness direction of the carbon fiber is limited, the conduction layer and the carbon fiber prepreg are not electrically connected. Accordingly, it is possible to prevent the conduction layer from being corroded by the conduction layer and the carbon fiber prepreg constituting a metal battery. Further, the surface direction cited herein is a direction in which the carbon fiber extends.

(2) The conduction layer may include a metal layer, and an insulating layer that insulates between the metal layer and the carbon fiber constituting the carbon fiber prepreg.

According to such a configuration, since the conduction in the surface direction of the carbon fiber is secured by the metal layer but the conduction in the thickness direction of the carbon fiber is limited by the insulating layer, the metal layer and the carbon fiber prepreg are not electrically connected. Accordingly, it is possible to prevent the metal layer from being corroded by the metal layer and the carbon fiber prepreg constituting a metal battery.

(3) A fuel tank according to the present invention includes the carbon-fiber-reinforced plastic structure, wherein the carbon-fiber-reinforced plastic structure forms an inner surface of the fuel tank.

According to such a configuration, static electricity generated due to friction between the fuel and the conduction layer is diffused to the vicinity by conducting through the conduction layer in the surface direction of the carbon fiber. On the other hand, since this static electricity does not conduct through the conduction layer in the thickness direction of the carbon fiber, the conduction layer and the carbon fiber prepreg are not electrically connected. Accordingly, it is possible to prevent the conductive layer from being corroded by the conduction layer and the carbon fiber prepreg constituting a metal battery.

Effects of the Invention

With the carbon-fiber-reinforced plastic structure according to the present invention, it is possible to add a secondary function of diffusing static electricity generated due to friction with the fuel to the vicinity to the CFRP structure constituting the fuel tank.

DESCRIPTION OF EMBODIMENTS

Hereinafter, an embodiment of the present invention will be described with reference to the drawings. First, a configuration of a carbon-fiber-reinforced plastic structure according to an embodiment of the present invention will be described. In the present embodiment, a constituent member of a fuel tank provided in a main wing of an aircraft will be described as an example of the carbon-fiber-reinforced plastic structure.

Figure 1:
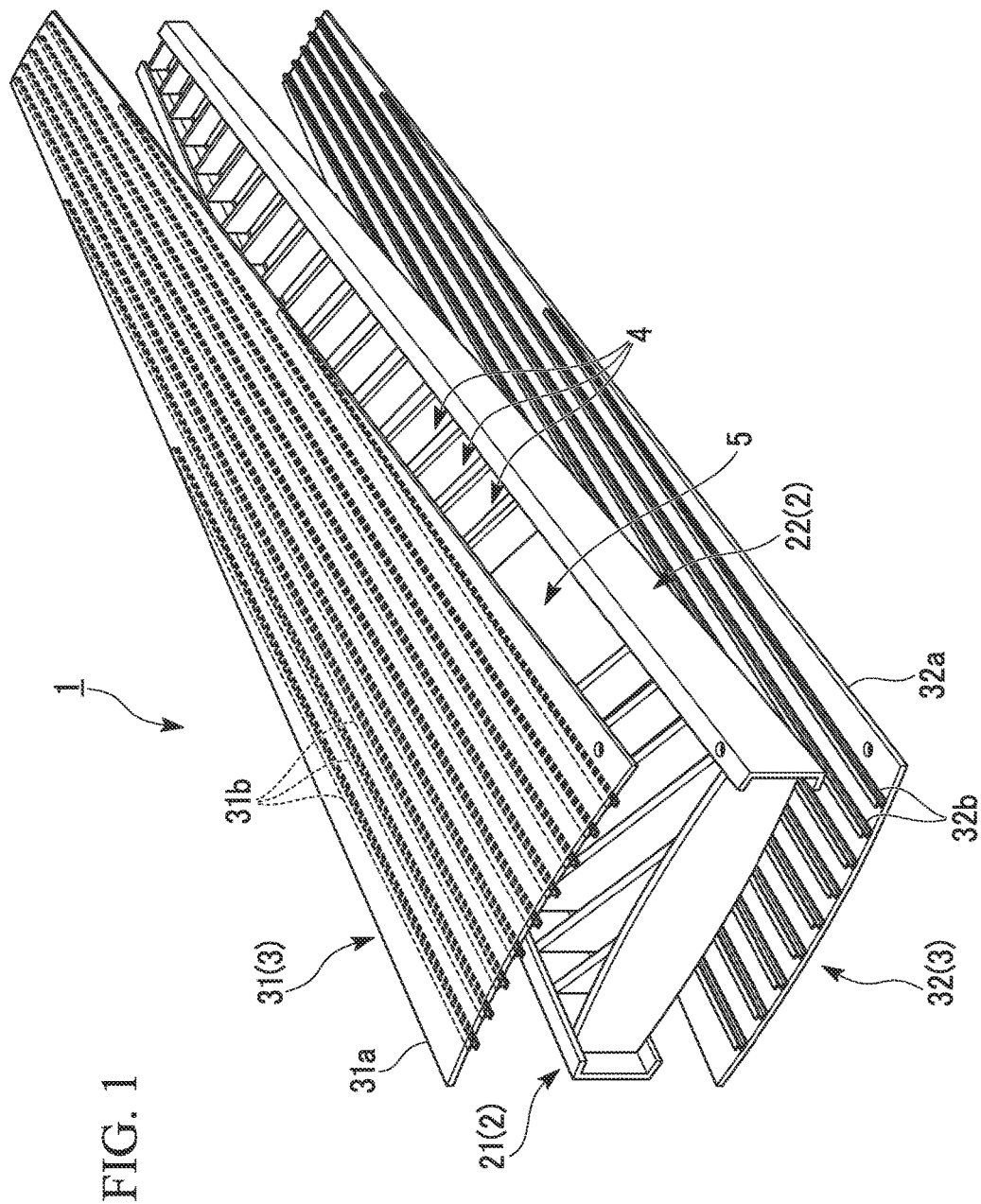
FIG. 1 is an exploded perspective view illustrating a schematic configuration of a main wing according to an embodiment of the present invention.

FIG. 1 is an exploded perspective view illustrating a schematic configuration of a main wing 1. The main wing 1 includes a pair of spars 2 that form both side portions along a longitudinal direction of the main wing 1, a pair of panels 3 that form a top surface and a bottom surface of the main wing 1, and a plurality of ribs 4 provided in the main wing 1.

Further, a fuel tank 5 is formed inside the main wing 1 configured in this way. This fuel tank 5 is an integral tank in which a container for storing fuel is formed of a structure itself of an aircraft body. Fuel, which is not shown, is filled inside the container formed of the pair of spars 2, the pair of panels 3 and the pair of ribs 4.

The pair of spars 2 includes a front spar 21 that forms the side portion on a front side of the aircraft among both side portions of the main wing 1, and a rear spar 22 that forms the side portion on a rear side of the aircraft, as shown in FIG. 1. The pair of spars 2 configured in this way is arranged at a predetermined interval so that apertures face each other. In addition, both of the front spar 21 and the rear spar 22 are members formed by molding carbon-fiber-reinforced plastic (CFRP).

The pair of panels 3 includes a top surface panel 31 forming the top surface of the main wing 1 and a bottom surface panel 32 constituting the bottom surface, as shown in FIG. 1. Further, the top surface panel 31 includes a top surface skin 31a having a curved cross-sectional shape, and a plurality of stringers 31b provided on one surface of the top surface skin 31a to increase bending stiffness of the top surface panel 31. In addition, both of the top surface skin 31a and the stringer 31b are members that are formed by molding carbon-fiber-reinforced plastic. Similarly, the bottom surface panel 32 includes a bottom surface skin 32a and a plurality of stringers 32b, which are members that are formed by molding the carbon-fiber-reinforced plastic.

The plurality of ribs 4 is a member for structurally reinforcing the main wing 1. The ribs 4 are provided in the longitudinal direction of the main wing 1 at predetermined intervals as shown in FIG. 1. One end of each rib 4 is connected to the front spar 21, and the other end is connected to the rear spar 22. Accordingly, the front spar 21 and the rear spar 22 are held at a certain interval. In addition, the ribs 4 are all metallic members.

Figure 2:
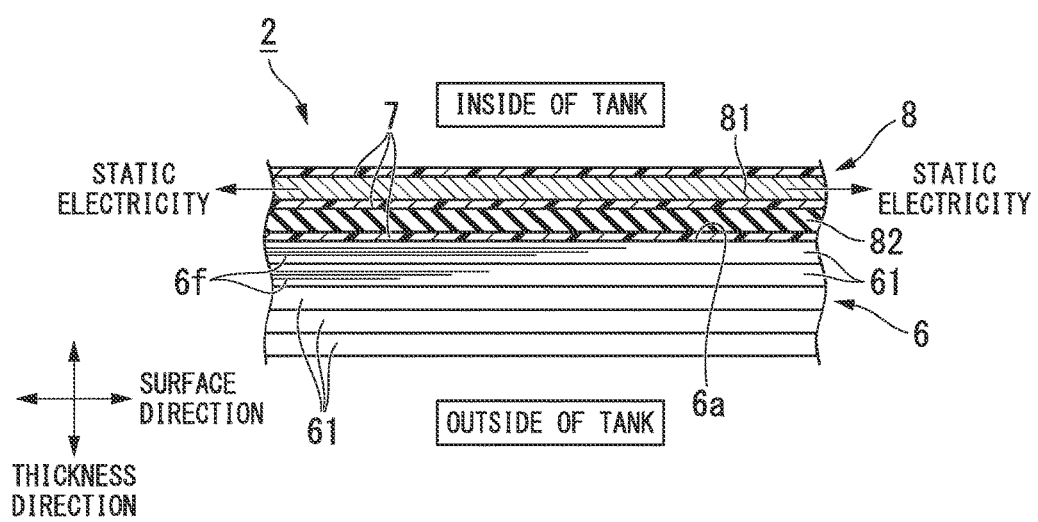
FIG. 2 is a schematic cross-sectional view illustrating part of a spar constituting a fuel tank according to an embodiment of the present invention.

Here, FIG. 2 is a schematic cross-sectional view illustrating part of the spar 2 constituting the fuel tank 5 according to the present embodiment. In addition, in FIG. 2, an upper side shows the inside of the fuel tank 5, and a lower side shows the outside of the fuel tank 5.

The spar 2 includes a layer-shaped carbon fiber prepreg 6, a resin layer 7 formed on a surface 6a of the carbon fiber prepreg 6, and a conduction layer 8 provided to be buried inside the resin layer 7, as shown in FIG. 2.

The carbon fiber prepreg 6 plays a role of a reference potential point. This carbon fiber prepreg 6 is formed by stacking a plurality of sheets 61 each obtained by soaking a thermosetting resin into a carbon fiber fabric obtained by alternately weaving carbon fibers 6f, and heating the sheets 61 to cure the thermosetting resin and unify the sheets 61, as shown in FIG. 2. Here, the carbon fiber prepreg 6 made of the carbon fiber 6f has electrical conductivity.

The resin layer 7 is a layer in which a thermosetting resin exuded from the carbon fiber at the time of curing of the thermosetting resin is stacked on the surface 6a of the carbon fiber prepreg 6. The resin layer 7 is thinly formed to cover the surface 6a of the carbon fiber prepreg 6, as shown in FIG. 2. Here, this resin layer 7 formed of the thermosetting resin is an insulator having no electrical conductivity.

The conduction layer 8 is intended to secure conduction of electricity only in a certain direction. This conduction layer 8 includes a metal layer 81 located inside the fuel tank 5 in the inside of the resin layer 7, and an insulating layer 82 located outside the fuel tank 5 in the inside of the resin layer 7, as shown in FIG. 2.

The metal layer 81 is a mesh-shaped sheet formed of a metal such as copper or aluminum, and has electrical conductivity. This metal layer 81 is provided to cover the surface 6a of the carbon fiber prepreg 6 through a gap with a predetermined width, as shown in FIG. 2. Further, although not shown in detail in FIG. 2, this metal layer 81 is connected electrically to the reference potential point. In addition, a material constituting the metal layer 81 is not limited to aluminum and any material having electrical conductivity may be used. Further, the metal layer 81 is not limited to the mesh shape of the present embodiment and may be formed as a foil form and a line form.

The insulating layer 82 is a sheet-shaped member formed of glass fiber or the like, and is an insulator having no electrical conductivity. This insulating layer 82 is provided to be located outside of the tank relative to the metal layer 81 through a gap with a predetermined width, as shown in FIG. 2. Accordingly, the metal layer 81 located inside of the tank and the carbon fiber prepreg 6 located outside of the tank, with the insulating layer 82 interposed therebetween, are electrically isolated. In addition, in the present embodiment, while the insulating layer 82 is provided a predetermined distance apart from the metal layer 81, the present invention is not limited thereto and the insulating layer 82 may be provided to be adhered to the metal layer 81. Further, a material constituting the insulating layer 82 is not limited to the glass fiber and any material having an insulation characteristic may be used.

According to the conduction layer 8 configured in this way, the conduction of electricity is secured in a surface direction (i.e., a direction in which the carbon fiber 6f extends) of the carbon fiber prepreg 6 due to the presence of the metal layer 81 inside the spar 2, but the conduction of the electricity is limited in the thickness direction of the carbon fiber prepreg 6 due to the presence of the insulating layer 82.

Next, an operational effect of the fuel tank 5 configured of the spar 2 according to the present embodiment will be described. In the inside of the fuel tank 5, static electricity is generated due to friction between filled fuel and an inner surface of the spar 2. However, this static electricity is diffused to the vicinity by flowing to the metal layer 81 buried in the CFRP structure through the thin resin layer 7 formed on the surface of the CFRP structure and conducting in a surface direction of the carbon fiber prepreg 6 along the metal layer 81, i.e., in a direction along the surface 6a. Accordingly, it is possible to prevent the resin layer 7 from being charged with electricity due to the friction with the fuel and the fuel from catching fire due to a spark caused by the static electricity.

On the other hand, since the conduction in the thickness direction of the carbon fiber prepreg 6 is limited due to the insulating layer 82, the static electricity conducting through the metal layer 81 in the surface direction does not flow from the metal layer 81 to the carbon fiber prepreg 6. Accordingly, it is possible to prevent the metal layer 81 from being corroded in advance by electrically connecting the metal layer 81 and the carbon fiber prepreg 6 and by the metal layer 81 and the carbon fiber prepreg 6 constituting a metal battery due to a potential difference therebetween.

In addition, in the present embodiment described above, while the spar 2 forming the fuel tank 5 has been described as an example of the CFRP structure, the CFRP structure may be other members constituting the fuel tank 5, e.g., the top surface skin 31a and the stringer 31b constituting the top surface panel 31 or the bottom surface skin 32a and the stringer 32b constituting the bottom surface panel 32 shown in FIG. 1.

Further, in the present embodiment, while the case in which the fuel tank 5 is an integral tank has been described by way of example, the present invention is not limited thereto and the fuel tank 5 formed of a carbon-fiber-reinforced plastic structure may be accommodated inside the space surrounded by the pair of spars 2, the pair of panels 3 and the pair of ribs 4.

Further, in the present embodiment, while the fuel tank 5 provided in the main wing 1 has been described as an example of the fuel tank 5 of the aircraft, the fuel tank 5 may be the fuel tank 5 provided in a position other than the main wing 1.

Further, in the present embodiment, while the fuel tank 5 of the aircraft has been described by way of example, the present invention is not limited thereto and may be applied to a fuel tank of other transportation means, such as a car, a motorcycle, or a ship, which is not shown.

Further, the shapes or combinations of the constituent members, the operation procedure or the like shown in the embodiment described above are an example, and may be modified based on design demands in various ways without departing from the scope and spirit of the present invention.

INDUSTRIAL APPLICABILITY

The present invention relates to a carbon-fiber-reinforced plastic structure including a carbon fiber prepreg, and a conduction layer provided on a surface of the carbon fiber prepreg to limit conduction in a thickness direction of carbon fiber and secure conduction in a surface direction of the carbon fiber. According to the present invention, it is possible to add a secondary function of diffusing static electricity generated due to friction with fuel to the vicinity to the CFRP structure constituting the fuel tank.

REFERENCE SIGNS LIST 1 main wing
2 spar
3 panel
4 rib
5 fuel tank
6 carbon fiber prepreg
6a surface
6f carbon fiber
7 resin layer
8 conduction layer
21 front spar
22 rear spar
31 top surface panel
31a top surface skin
31b stringer
32 bottom surface panel
32a bottom surface skin
32b stringer
61 sheet
81 metal layer
82 insulating layer

The invention claimed is:

1. A fuel tank formed from a carbon-fiber-reinforced plastic structure comprising:
   a carbon fiber prepreg including a carbon fiber and a thermosetting resin;
   a resin layer laminated on a surface of the carbon fiber prepreg, the resin layer being formed of the thermosetting resin exuded from the carbon fiber prepreg; and
   a conduction layer having a metal layer and an insulating layer that insulates the carbon fiber constituting the carbon fiber prepreg from the metal layer so that static electricity does not flow from the metal layer to the carbon fiber prepreg, the insulating layer being made from a sheet-shaped member formed of glass fiber, and the conduction layer being provided inside the resin layer to limit conduction in a thickness direction of the carbon fiber and secure conduction in a surface direction of the carbon fiber,
   wherein the metal layer is embedded in the resin layer,
   wherein the insulating layer is provided so as to be located between the metal layer and the carbon fiber prepreg, and
   wherein the resin layer forms an inner surface of the fuel tank.

* * * * *